United States Patent
Nishikawa et al.

(10) Patent No.: US 7,171,423 B2
(45) Date of Patent: Jan. 30, 2007

(54) INFORMATION PROCESSING SYSTEM AND SYSTEM SETTING METHOD

(75) Inventors: Norifumi Nishikawa, Machida (JP); Kazuhiko Mogi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 10/650,773

(22) Filed: Aug. 29, 2003

(65) Prior Publication Data

US 2004/0199526 A1 Oct. 7, 2004

(30) Foreign Application Priority Data

Mar. 18, 2003 (JP) ............... 2003-074034

(51) Int. Cl.
G06F 17/30 (2006.01)
G06F 15/16 (2006.01)

(52) U.S. Cl. ............... 707/102; 707/205; 707/10; 707/2; 711/100; 709/226

(58) Field of Classification Search ............... None
See application file for complete search history.

(56) References Cited

U.S. PATENT DOCUMENTS

| | | | |
|---|---|---|---|
| 5,761,653 A * | 6/1998 | Schiefer et al. ............ | 707/2 |
| 5,881,378 A | 3/1999 | Hayashi et al. | |
| 6,161,105 A * | 12/2000 | Keighan et al. ............ | 707/100 |
| 6,625,617 B1 | 9/2003 | Yarnall et al. | |
| 6,754,679 B1 | 6/2004 | Oheda | |
| 2002/0198899 A1 | 12/2002 | Yamaguchi et al. | |
| 2003/0093647 A1 | 5/2003 | Mogi et al. | |

FOREIGN PATENT DOCUMENTS

JP 2001-142648 5/2001

OTHER PUBLICATIONS

Jun Rao, et al., "Automating Physical Design in a Parallel Database", Proceedings of the 2002 ACM SIGMOD International Conference on Management of Data, 2002, pp. 558-569.

* cited by examiner

*Primary Examiner*—Apu M Mofiz
*Assistant Examiner*—Mark Andrew X Radtke
(74) *Attorney, Agent, or Firm*—Mattingy, Stanger, Malur & Brundidge, P.C.

(57) ABSTRACT

An objective of the present invention is to carry out setting efficiently both a database management system and a storage subsystem. In an information processing system having computers 1, 2 and the storage subsystem 3, the following processes are executed. A system definition program 5 in the computer 1 generates based on the database design information, database definition information defining a structure of plural tables constituting the database and storage location volume of data of the plural tables, and volume definition information defining a condition for determining a volume configuration. A volume definition program 6 in the storage subsystem 3 determines based on the volume definition information from the management server 1, a storage device configuring the volume out of plural storage devices 36a ... 36p. A database management system program 9 in the computer 2 stores the data of each table in the volume of the storage subsystem 3, based on the definition information from the management server 1, and accesses the volume in response to a request from outside.

28 Claims, 15 Drawing Sheets

FIG.2

| CPU SPECIFICATION | DATA PROCESSING PERFORMANCE [MB/s] |
|---|---|
| 1.4GHz | 20 [MB/s] |
| 800MHz | 15 [MB/s] |

FIG.3

| I/O PERFORMANCE [MB/s] | RAID LEVEL | DEGREE OF PARALLELISM | BLOCK LENGTH |
|---|---|---|---|
| 50 [MB/s] | 5 | 3 | 64K |
| 80 [MB/s] | 0+1 | 4 | 64K |
| 100 [MB/s] | 0+1 | 5 | 64K |

FIG.5

| TRANSACTION HISTORY | 10 MILLION | — 1101a |
| STORE SUMMARY | 0.8 MILLION | — 1101b |
| DIVISION SUMMARY | 4 MILLION | — 1101c |

```
INSERT INTO  STORE SUMMARY
SELECT       YEAR AND MONTH, STORE, SUM (SUM OF MONEY)
FROM         TRANSACTION HISTORY
GROUP BY     YEAR AND MONTH, STORE
```
— 1201a₂
— 1201a₃
— 1201a₃

1201

1201b₁

```
INSERT INTO  DIVISION SUMMARY
SELECT       YEAR AND MONTH, STORE, SUM(SUM OF MONEY)
FROM         TRANSACTION HISTORY
GROUP BY     YEAR AND MONTH, STORE, DIVISION
```
— 1201b
— 1201b₂
— 1201b₃

FIG.7

| CPU SPECIFICATION | 1.4GHz | — 1301 |
| CPU COUNT | 4 | — 1302 |

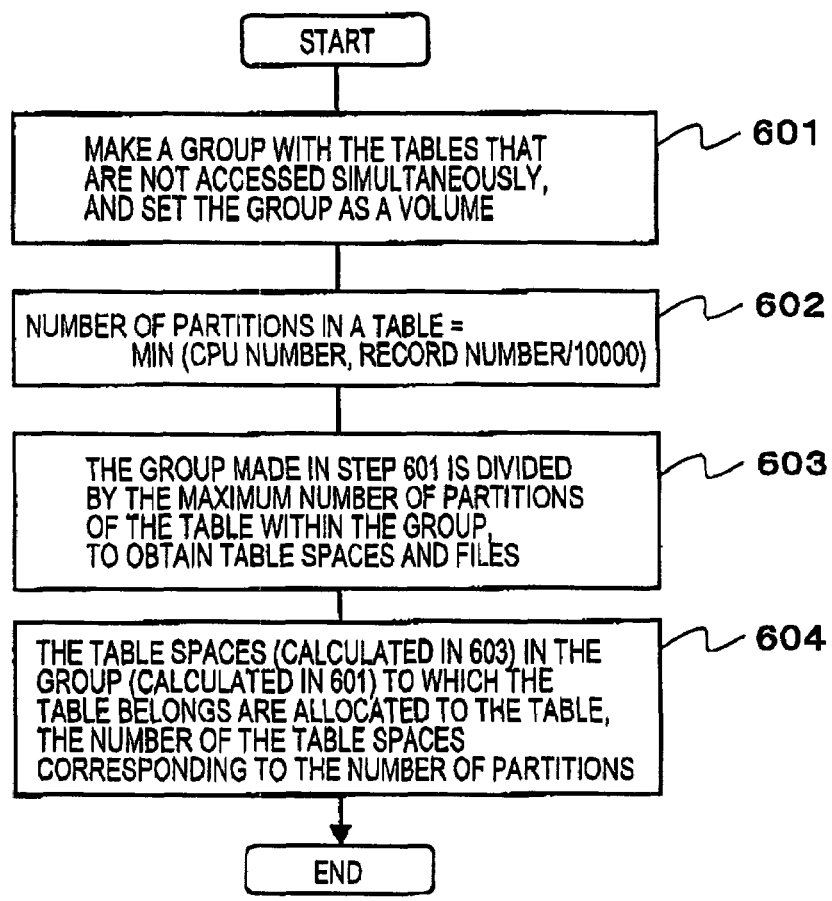

| TABLE | NUMBER OF PARTITIONS |
|---|---|
| TRANSACTION HISTORY | 4 |
| STORE SUMMARY | 4 |
| DIVISION SUMMARY | 4 |

| VOLUME | FILE | TABLE SPACE | |
|---|---|---|---|
| VOLUME 1 | FILE 11 | TABLE SPACE 11 | ⎫ |
| VOLUME 1 | FILE 12 | TABLE SPACE 12 | ⎬ 1701a |
| VOLUME 1 | FILE 13 | TABLE SPACE 13 | |
| VOLUME 1 | FILE 14 | TABLE SPACE 14 | ⎭ |
| VOLUME 2 | FILE 21 | TABLE SPACE 21 | ⎫ |
| VOLUME 2 | FILE 22 | TABLE SPACE 22 | ⎬ 1701b |
| VOLUME 2 | FILE 23 | TABLE SPACE 23 | |
| VOLUME 2 | FILE 24 | TABLE SPACE 24 | ⎭ |

| TABLE | TABLE SPACE |
|---|---|
| RANSACTION HISTORY | TABLE SPACE 11, 12, 13, 14 |
| STORE SUMMARY | TABLE SPACE 11, 22, 23, 24 |
| DIVISION SUMMARY | TABLE SPACE 21, 22, 23, 24 |

| TABLE | CAPACITY [MB] |
|---|---|
| TRANSACTION HISTORY | 410 |
| STORE SUMMARY | 22 |
| DIVISION SUMMARY | 126 |

2000

| VOLUME | CAPACITY [MB] |
|---|---|
| VOL1 | 410 |
| VOL2 | 148 |

2100

| VOLUME | CAPACITY [MB] | RAID LEVEL | DEGREE OF PARALLELISM | BLOCK LENGTH | |
|---|---|---|---|---|---|
| | | 2202 | | | |
| VOL1 | 410 | 0+1 | 4 | 64K | 2210a |
| VOL2 | 148 | 0+1 | 4 | 64K | 2210b |

2201

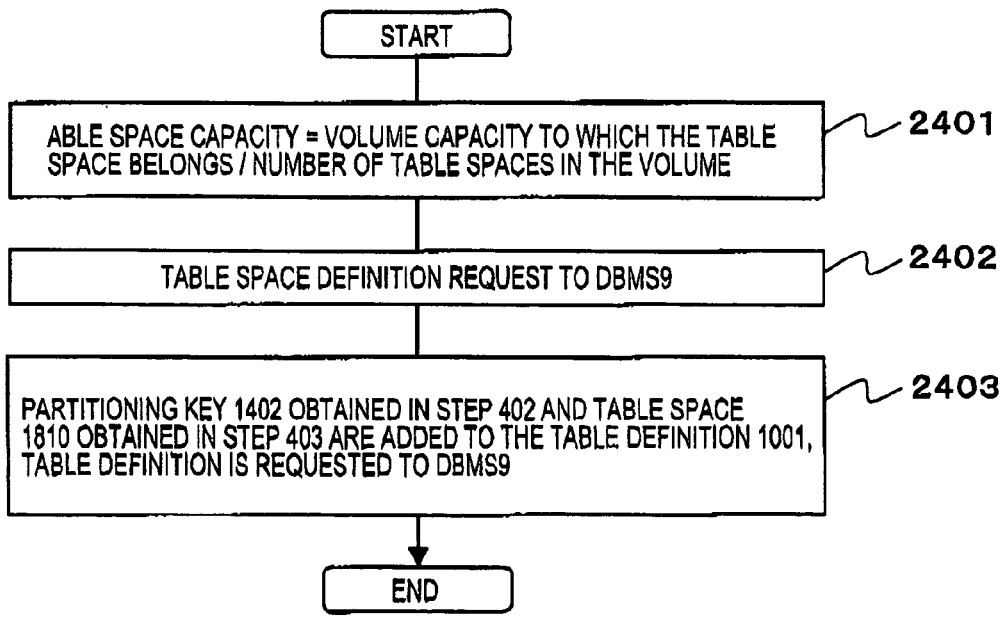

FIG.25

CREATE TABLESPACE     TABLE SPACE 11
SIZE 102.5MB ON     /VOL1   /FILE 11      ~2501

CREATE TABLESPACE     TABLE SPACE 12
SIZE 102.5MB ON     /VOL1   /FILE 12

CREATE TABLESPACE     TABLE SPACE 13
SIZE 102.5MB ON     /VOL1   /FILE 13

CREATE TABLESPACE     TABLE SPACE 14
SIZE 102.5MB ON     /VOL1   /FILE 14

CREATE TABLESPACE     TABLE SPACE 21
SIZE 37MB ON     /VOL 2 /FILE 21

CREATE TABLESPACE     TABLE SPACE 22
SIZE 37MB ON     /VOL2   /FILE 22

CREATE TABLESPACE     TABLE SPACE 22
SIZE 37MB ON     /VOL2   /FILE 23

CREATE TABLESPACE     TABLE SPACE 22
SIZE 37MB ON     /VOL2   /FILE 24

FIG.26

```
CREATE TABLE TRANSACTION HISTORY (
    YEAR AND MONTH    DATE,
    CUSTOMER          CHAR(5),
    STORE             CHAR(5),
    DIVISION          CHAR(5),
    ITEM              CHAR(5),
    SUM OF MONEY      DECIMAL(15)
) PARTITION BY  YEAR AND MONTH, STORE, DIVISION
                INTO TABLE SPACE 11,
                TABLE SPACE 12, TABLE SPACE 13,
                TABLE SPACE 14
```
～2601a

```
CREATE TABLE STORE SUMMARY (
    YEAR AND MONTH    DATE,
    STORE             CHAR(5),
    SUM OF MONEY      DECIMAL(15)
) PARTITION BY  YEAR AND MONTH, STORE
                INTO TABLE SPACE 21,
                TABLE SPACE 22, TABLE SPACE 23,
                TABLE SPACE 24
```
～2601b

```
CREATE TABLE DIVISION SUMMARY (
    YEAR AND MONTH    DATE,
    STORE             CHAR(5),
    DIVISION          CHAR(5),
    SUM OF MONEY      DECIMAL(15)
) PARTITION BY  YEAR AND MONTH, STORE, DIVISION
                INTO TABLE SPACE 21,
                TABLE SPACE 22, TABLE SPACE 23,
                TABLE SPACE 24
```
～2601c

INFORMATION PROCESSING SYSTEM AND SYSTEM SETTING METHOD

DESCRIPTION OF THE RELATED ART

The present invention relates to a setting support technique for a database management system and a storage subsystem, which are installed in a computer system.

As a storage setting support technique, a technique disclosed in the Japanese Patent Application Laid-Open No. 2001-142648 is known. According to this technique, a management host computer selects a memory device that complies with requirements (capacity, performance condition, reliability level and the like) from the host computer, among the memory devices held by the storage subsystem, and instructs the storage subsystem to carry out a setting that allows the host computer to access the selected memory device.

As a design support technique for a database, a technique disclosed in "Automating Physical Database Design in a Parallel Database", Jun Rao et al., Proceedings of the 2002 ACM SIGMOD international conference on Management of Data, 2002, pp. 558–569, is known. According to this technique, when an information processor accepts an input of plural workloads (SQL statements), an optimizer of the database management system calculates a horizontal partitioning method of a table, which minimizes an execution cost of those total workloads, so that the calculated horizontal partitioning method is presented. As a candidate for a horizontal partitioning key, an aggregation key, a join column, columns referenced in equality are given.

Mere combination of the techniques as described in the two documents above requires that setting for the storage and setting for the database management system are individually carried out.

SUMMARY OF THE INVENTION

An object of the present invention is to efficiently carry out setting of both the database management system and the storage subsystem. In order to achieve the above object, according to one aspect of the present invention, an information processor is provided comprising:

an input means which receives an input of database design information, and a system definition means which generates based on the database design information, database definition information determining a volume to be used as a storage location of data of a plurality of tables constituting the database, and volume definition information determining a configuration required for the volume, and outputs the volume definition information as information to be given to the storage subsystem having a plurality of memory devices to be allocated to the volume based on the volume definition information, and the definition information as information to be given to a database server which is a server to store based on the database definition information, data of each of the tables in the volume of the storage subsystem, and to access the volume of the storage subsystem in response to a request from outside.

BRIEF DESCRIPTION OF THE DRAWINGS

FIG. 2 is an illustration conceptually showing a data structure of a CPU performance table held by a management server as shown in FIG. 1.

FIG. 3 is an illustration conceptually showing a data structure of a volume performance table held by the management server as shown in FIG. 1.

FIG. 5 is an illustration conceptually showing a data structure of record number information, which is inputted into the system definition program relating to the embodiment of the present invention.

FIG. 6 is an illustration showing examples of a SQL statement, which is inputted into the system definition program relating to the embodiment of the present invention.

FIG. 7 is an illustration showing a designation example of CPU information, which is inputted into the system definition program relating to the embodiment of the present invention.

FIG. 11 is a flowchart showing a process executed in step S403 FIG. 8.

FIG. 12 is an illustration showing a determined example as to group and volume of a table.

FIG. 13 is an illustration showing an example of a number of partitions determined for each table.

FIG. 14 is an illustration showing an example for allocating a file and a table space to the volume.

FIG. 15 is an illustration showing an example for allocating the table spaces to the table.

FIG. 23 is an illustration conceptually showing a data structure of a volume definition table of the storage subsystem.

FIG. 24 is a flowchart showing a process executed in step S407 in FIG. 8.

FIG. 25 is an illustration showing a description example of a table space definition statement, included in a table space definition request, which is issued to a database server.

FIG. 26 is an illustration showing a description example of a table definition statement included in a table definition request, which is issued to the database server.

DESCRIPTION OF THE PREFERRED EMBODIMENTS

Referring to the attached drawings, preferred embodiments relating to the present invention will be explained in detail.

At first, an entire configuration of an information processing system of the present embodiment will be explained.

Figure 1:
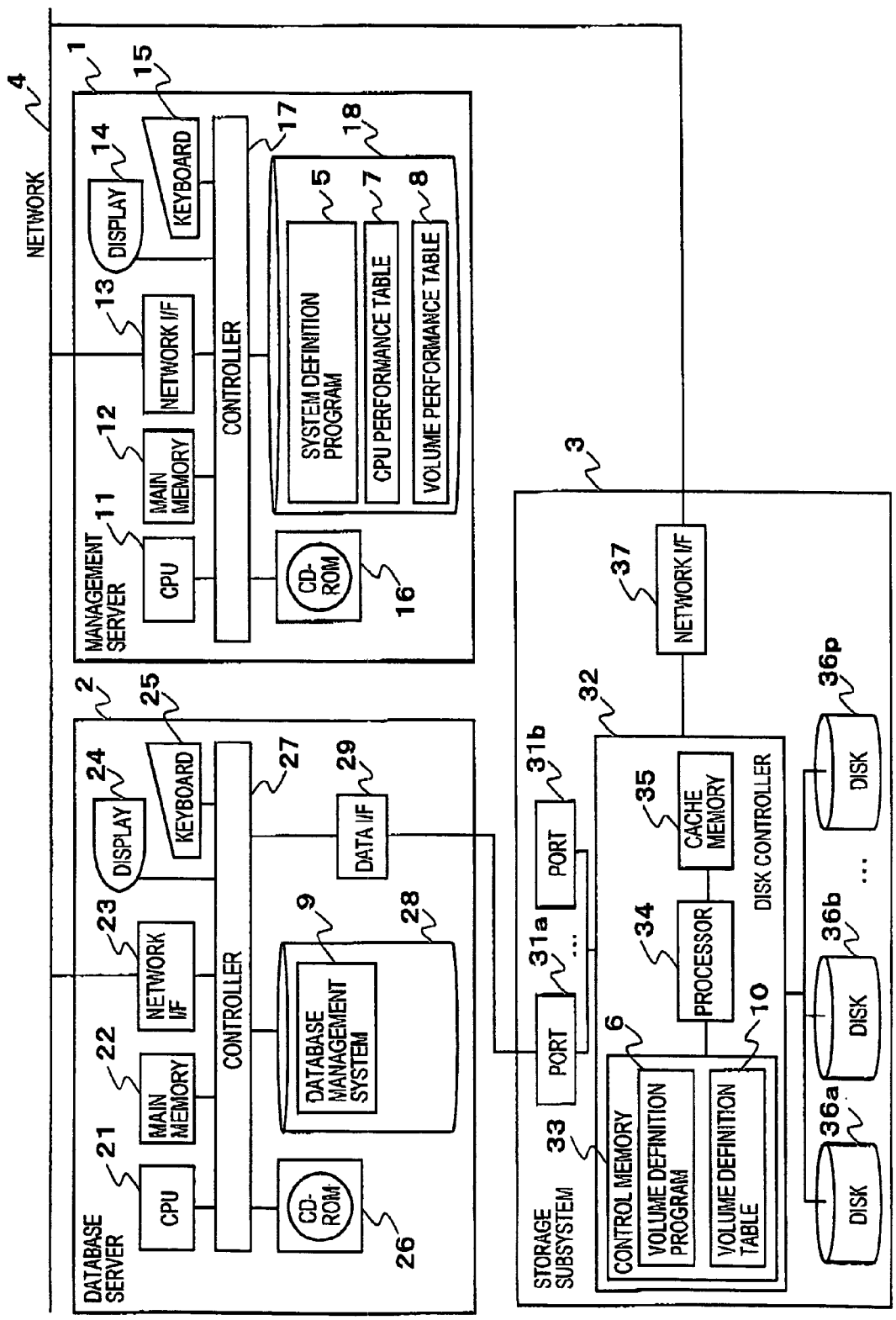
FIG. 1 is schematic diagram of an information processing system relating to an embodiment of the present invention.

As shown in FIG. 1, the information processing system of the present embodiment comprises a network 4, a plurality of computers (here, two computers 1, 2) which are connected to the network 4, and a storage subsystem 3 which is directly connected to at least one of these computers 1, 2 (here, one computer 2), as well as connected to the network 4. Here, the storage subsystem 3 is directly connected to the computer 2. However, it may be connected to the computer through a switch, other network, or the like.

The computer 2, to which the storage subsystem 3 is connected, is a database server to generate a table constituting a database on a volume of the storage subsystem 3. Then, on a database request as to the table of the database, the database server accesses the volume in which the table is stored. This database server 2 comprises a drive 26 which carries out data reading process from a storage medium (CD-ROM, flexible disk, tape and the like) being mounted, a network interface 23 which controls a communication via the network 4, a storage device 28 in which various programs such as database management system program 9 defining database generating process and database processing, are installed via the network 4 or from the storage medium, a main memory 22, a CPU 21 which executes a program loaded onto the main memory from the storage device 29, data interface 29 which controls data transfer process with the storage subsystem 3, and a controller 27 which controls the data transfer between each of the above units. As appropriate, the controller 27 is further connected to an output device (e.g., a display 24) which outputs information to be provided to a user, and an input device (e.g., a keyboard 25) which accepts a data input from the user.

The other computer 1 is a management server which issues to the storage subsystem 3, a request (a table space definition request or a table definition request) which instructs to start a database generating process, as well as issuing to the database server 2, a volume definition request to instruct to start of a volume definition process. This management server 1 comprises a drive 16 which executes a data reading process from the storage medium (CD-ROM, flexible disk, tape and the like) being mounted, a network interface 13 which controls a communication via the network 4, a storage device 18 on which various programs such as system definition programs 5 defining of system definition process as described below, are installed via the network 4 or the storage medium, a main memory 12, a CPU 11 which executes a program loaded on the main memory 12 from the storage device 18, and a controller 17 which controls data transfer between each or those units. The controller 17 is further connected to an output device (e.g., a display 14) which presents information to a user, and an input device (e.g., a keyboard 15) which accepts a data input from the user as an input of design information which has been generated during the database design.

Further, in the storage device 18 of the management server 1, two types of data tables 7, 8 are stored in advance, which are referred to in a system definition process. As shown in FIG. 2, in the data table 7 (CPU performance table), CPU performance information items 210a, 210b are respectively stored by CPU type. Each CPU performance information item includes CPU specification information 201, indicating a CPU specification, and data processing performance information 202, indicating a CPU I/O performance. As shown in FIG. 3, in the other data table 8 (volume performance table), there is stored correspondence information between a plurality of I/O performance information items 301 indicating I/O performance of a volume (volume performance), and information items 310 (volume definition information) defining conditions for determining a volume configuration for implementing the volume performance. Each of the volume definition information items 310 includes RAID level data 302 indicating an RAID level, stripe width data 303 indicating a stripe width, block length data 304 indicating a block length.

The storage subsystem 3 includes a plurality of disks 36a . . . 36p, into which the database management system 9 stores table data constituting the database, a plurality of ports 31a . . . 31b including the port 31a which is connected to the database server 2, a disk controller 32 which executes an I/O processing as to the disks 36a . . . 36p according to an I/O request from the database server 2, and a network interface 37 which controls a communication via the network 4.

The disk controller 32 includes a control memory 33 which stores various programs such as disk I/O processing programs (not illustrated) defining a disk I/O processing and a volume definition program 6 defining a volume definition processing, which will be described below, a processor 34 which executes the programs in the control memory 33, and a cache memory 35 which temporarily holds data to be written on the disk and data read out from the disk. The control memory 33 further stores a volume definition table 10, which is referred to during a disk I/O processing. As shown in FIG. 23, according to the volume definition processing as described below, this volume definition table 10 stores volume configuration information items 2310a to 2310p respectively for the disks held by the storage subsystem 3. Each of the volume configuration information items 2310a to 2310p includes disk identification information 2303, disk-allocated volume identification information 2301, volume RAID level 2302, a volume start block number 2304 and a volume end block number 2305.

With such a configuration as described above, in the information processing system relating to the present embodiment, it is possible for a user to easily construct a database system with a higher performance, just by inputting in the system definition program 5 on the management server 1, a predetermined information (hereinafter, referred to as database related information) among design information having been generated during database design process. Hereinafter, further explanation will follow with a specific application example.

At first, the database related information which is to be inputted by a user in the system definition program 5.

The user is only required to input in the system definition program 5, following information (a table definition statement of each table created in the database, record number information, at least one SQL statement, and CPU information) as database related information, among the design information having been generated during the database design process.

Figure 4:
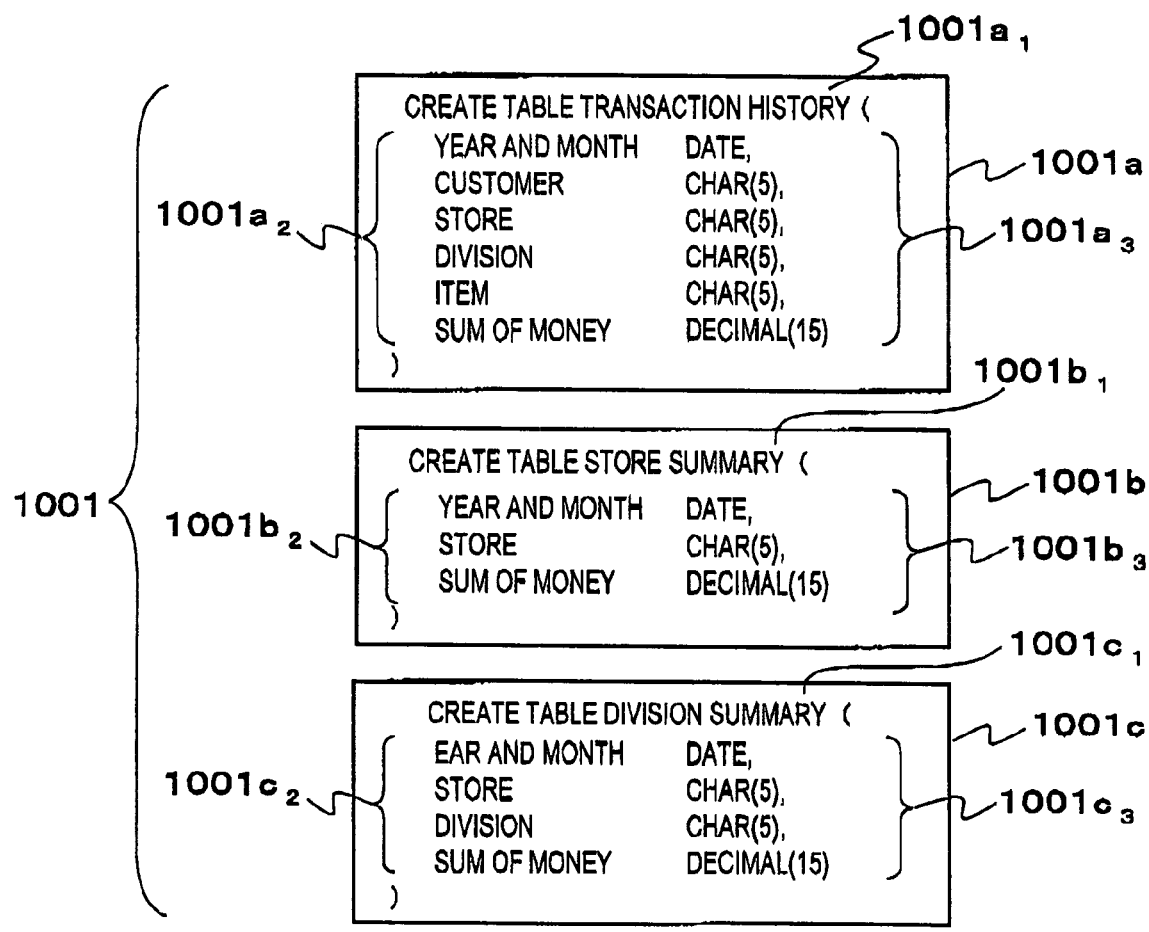
FIG. 4 is an illustration showing examples of table definition statement, which is inputted into a system definition program relating to the embodiment of the present invention.

The table definition statement is a "CREATE TABLE" statement which includes a name of the table created in the database and data definition (a title of column included in the table, and data type inputted in each column). FIG. 4 shows a description example of the table definition statement 1001 of a transaction history table, a store summary table and a division summary table. In the table definition statement 1001a for the transaction history table, a table name "transaction history" $1001a_1$, titles of the columns $1001a_2$ included in the table, i.e., "year and month", "customer", "store", "division", "item" and "amount of money", and data type $1001a_3$ of the data inputted into each column are defined. In the table definition statement 1001b of the store summary table, a table name "store summary" $1001b_1$, titles of the columns $1001b_2$ included in the table, i.e., "year and month", "store", and "amount of money", and data type $1001b_3$ of the data inputted into each column are defined. In the table definition statement 1001c of the division summary table, a table name "division summary" $1001c_1$, titles of the columns $1010c_2$ included in the table, i.e., "year and month", "store", "division" and "amount of money", and data type $1001c_3$ of the data inputted into each column are defined. These table definition statements 1001a to 1001c are only examples shown for convenience of the following discussion.

Conventionally, in addition to the table name and the data definitions a user defines in the table definition statement to be given to the database management system, a table space on the storage subsystem for storing each table, as well as a partitioning key and the like as necessary for each table. However, in the present embodiment, such information will be automatically generated by the process discussed below, and thus it is not necessary for the user to define the table space and the partitioning key in the table definition statement.

The record number information defines the number of the records capable of being registered in the table defined in each table definition statement. For example, as shown in FIG. 5, corresponding information items 1101a to 1101c between the table names and the record numbers being registrable are described respectively for the three tables which are defined by the table definition statements as shown in FIG. 4. In FIG. 5, "10 million" rows, "0.8 million" rows and "4 million" rows are shown as the number of records being registrable in the transaction history table, the store summary table and the division summary table, respectively, but these numerical values are mere examples for convenience of the following discussion.

A SQL statement is a set of orders which describe in SQL language, contents of data manipulation within a table having been created in the database. FIG. 6 shows examples of SQL statements 1201a and 1201b. With the SQL statement 1201a, a row (year and month, store, sum of money) including a sum of data in column "amount of money" retrieved from the transaction history table, is inserted into the store summary table, and with the SQL statement 1201b, a row (year and month, store, division, sum of money) including a sum of data in column "amount of money" retrieved from the transaction history table, is inserted to the division summary table.

In the SQL statement 1201a, the table name "store summary" to which a row is inserted, is designated by the "INSERT INTO" phrase $1201a_1$, and the table name "transaction history" from which a column is to be retrieved, is designated by the "FROM" phrase $1201a_2$, In addition, the title of columns "year and month" and "store" are designated by "GROUP BY" phrase $1201a_3$, which are the column names used for grouping the rows included in the table (transaction history table) being designated by "FROM" phrase, i.e., for grouping the rows having a same data value in the column. Even more particularly, the "SELECT" phrase $1201a_2$ designates the column names "year and month" and "store" retrieved from the table (transaction history table) being designated by the "FROM" phrase, and an aggregate function "SUM" which is passed as argument, the column name "amount of money" retrieved from the transaction table. The "SUM" is an aggregate function, i.e., SUM ( ):data in the column with the name passed as the arguments is summed by group categorized by a column value which is designated by "GROUP BY" phrase, and the values summed by group are returned, According to the SQL statements 1201a as described above, the columns "year and month" and "store" in the transaction history table are referred to, and with the data in the two columns, rows of the transaction history table are grouped. The sum of data in column "amount of money" is calculated by group of the rows of the transaction history table, and then, year and month data, store data and sum data, which have been obtained by group, are respectively inserted into the store summary table as a row {"year and month" "store" "sum of money"}.

In the SQL statement 1201b, the table name "division summary" into which a row is inserted, is designated by the "INSERT INTO" phrase $1201b_1$, and the table name "transaction history" from which a column is to be retrieved, is designated by the "FROM" phrase $1201b_2$. In addition, the title of columns "year and month", "store" and "division" are designated by "GROUP BY" phrase $1201a_3$, which are the column names used for grouping the rows included in the table (transaction history table) being designated by "FROM" phrase, i.e., for grouping the rows having a same data value in the column. Even more particularly, the "SELECT" phrase $1201b_2$ designates the column names "year and month", "store" and "division" retrieved from the table (transaction history table) being designated by the "FROM" phrase, and an aggregate function "SUM" which is passed as argument, the column name "amount of money" retrieved from the transaction table. The "SUM" is an aggregate function, i.e., SUM( ): row data in the column of the name passed as the arguments is summed by group categorized by a column value which is designated by "GROUP BY" phrase, and the values summed by group are returned. According to the SQL statements 1201b as described above, the columns "year and month", "store" and "division" in the transaction history table are referred to, and the rows having same data in each of the three columns "year and month", "store" and "division" are grouped. The aggregated amount of "amount of money" in the rows of the transaction history table is calculated by group, and then, year and month data, store data, division data and sum data, which have been obtained by group, are respectively inserted into the division summary table as a row {"year and month" "store" "division" "sum of money"}It should be noted that the SQL statement shown in FIG. 6 is only an example of description shown for convenience of the following discussion.

CPU information includes information correlating to I/O performance of the database server. Specifically, it includes, as shown in FIG. 7, CPU specification 1301 and CPU count 1302 in the database server, which are available for the data manipulation as described in the SQL statements 1201a and 1201b. In FIG. 7, "1.4 GHz" is shown as the CPU specification and "4" is shown as the CPU count, but these numeric values are only examples for convenience of the following discussion.

Figure 8:
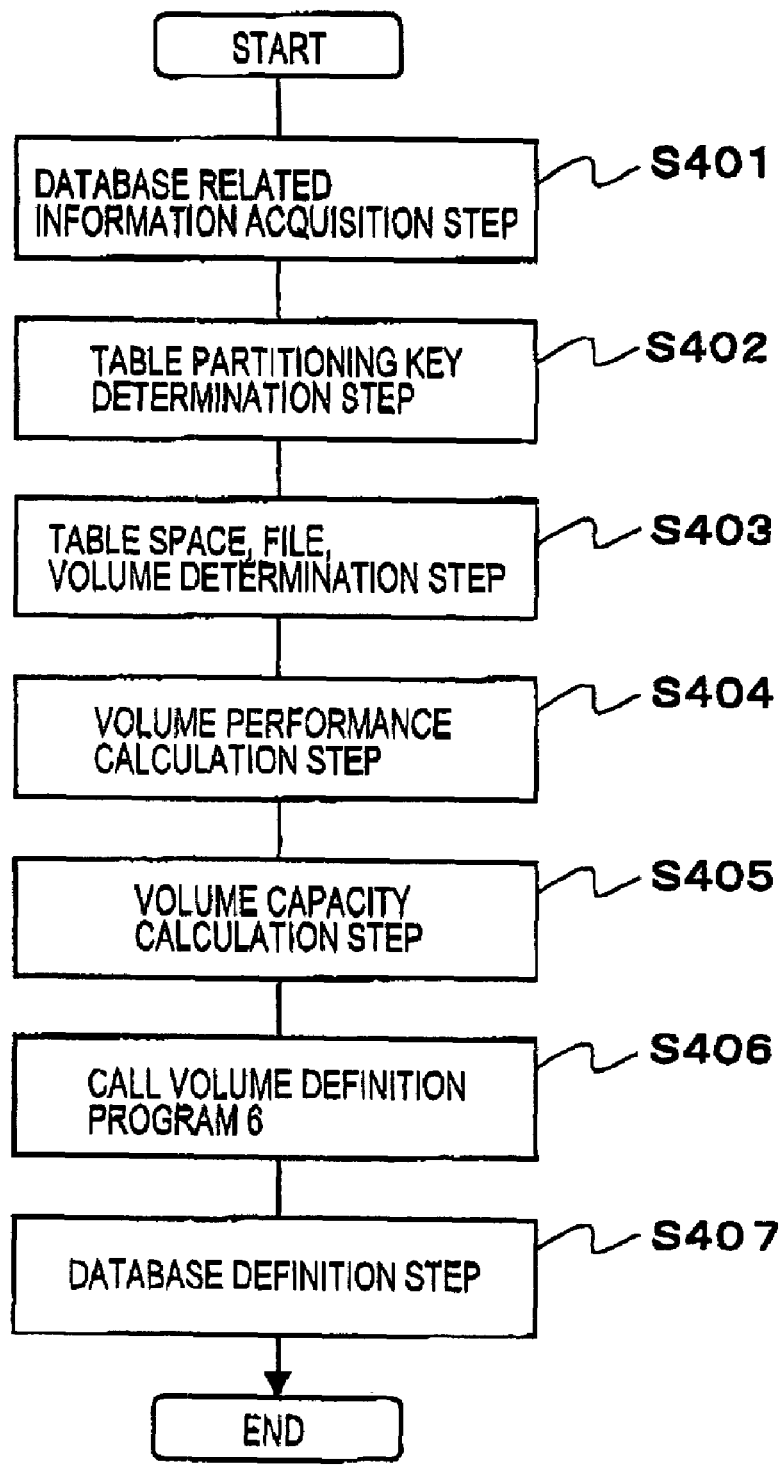
FIG. 8 is flowchart showing a system definition process, which is executed by the system definition program relating to the embodiment of the present invention.

Next, according to FIG. 8, a system definition process will be explained, which is implemented when a user starts a system definition program 5 on the management server 1.

The system definition program 5 having been started on the management server 1 executes the following series of processes S401 to S407. In explaining each process, the database related information items as shown in FIG. 4 to FIG. 7 are employed, and the other figures will be referred to appropriately, as the need arises.

(1) S401

The system definition program 5 requests the user to input the database related information. In response to the request, when the user designates on the management server 1, a file which stores the aforementioned database related information (table definition statement, SQL statement, record count and CPU information), the system definition program 5 reads the database related information from the file.

(2) S402

Figure 9:
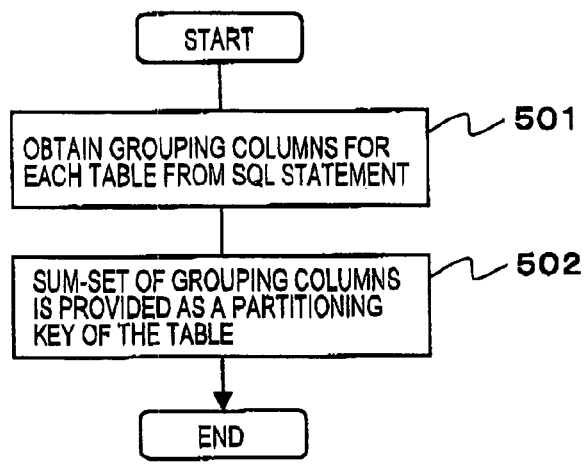
FIG. 9 is flowchart showing a process executed in step S402 of FIG. 8.

Upon completion of process S401 for acquiring database related information, the system definition program 5 determines a partitioning key for horizontally partitioning the table defined as a target for data input/output, in the SQL statements within the database related information. Specifically, the following processes as shown in FIG. 9 are executed.

At first, the system definition program 5 extracts from each SQL statement in the database related information, table names on/from which data input/output is carried out (which will be referred to as I/O tables), i.e., table names described after the "INSERT INTO" phrase and "FROM" phrase, respectively, and a column name used for grouping (which will be referred to as grouping column), i.e., a column name described after the "GROUP BY" phrase (S501). For example, when two SQL statements 1201a, 1201b shown in FIG. 6 are included in the database related information, the I/O table names, "store summary" and "transaction history", and the grouping column names, "year and month", "store" are extracted from one of the SQL statements, 1201a, and the I/O table names "division summary", "transaction history" and the grouping column names "year and month", "store", and "division" are extracted from the other SQL statement 1201b.

Subsequently, for each I/O table the name of which is extracted at least once according to the SQL statement of the database related information in step S501, the system definition program 5 generates as a partitioning key a list of grouping column names extracted at least once with the I/O table (S502).

Figure 10:
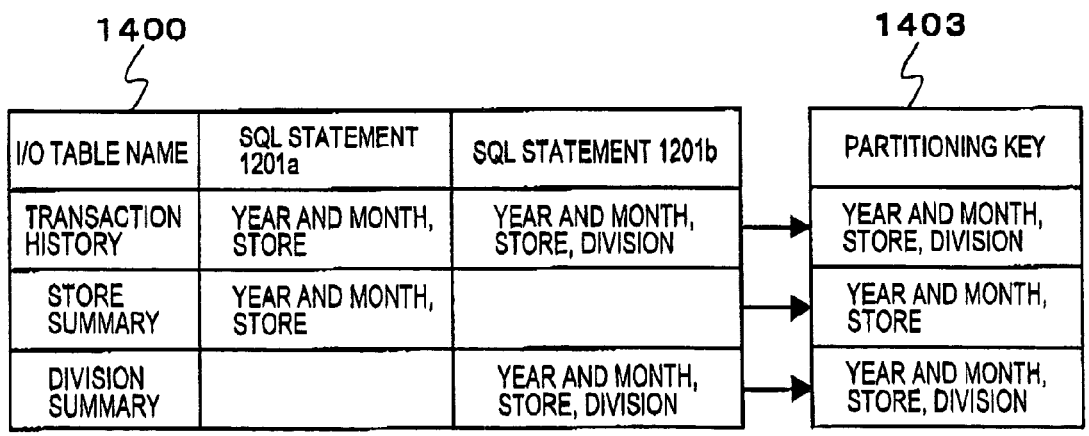
FIG. 10 is an illustration for explaining a method for deciding a partitioning key in step S402 of FIG. 8.

For example, in order to determine the partitioning key concerning each of the two SQL statements 1201a, 1201b as shown in FIG. 6, firstly, a grouping column name is made associated with each of the I/O table names having been extracted, as to each SQL statement, 1201a, 1201b. Accordingly, as to the SQL statement 1201a, two I/O table names "transaction history" and "store summary" are respectively associated with the grouping column names "year and month" and "store". As to the other SQL statement 1201b, two I/O table names "transaction history", "division summary" are respectively associated with the grouping column names, "year and month" "store" and "division". Table 1400 in FIG. 10 conceptually shows the correspondence generated at this stage in a table format (column title: SQL statement name, row title: I/O table name). Here, blanks in the table 1400 indicate that there is no grouping column name in the SQL statement, which is associated with the I/O table name. Next, for each I/O table name, a sum-set of the associated grouping column names is generated (the sum-set of grouping column names existing in a row of each I/O table name in table 1400), and thus obtained sum-set becomes a candidate for a partitioning key. For example, a candidate for the partitioning key of the I/O table name "transaction history" is {"year and month" "store" "division"}, which is a sum-set of grouping column names {"year and month" "store"} and grouping column names {"year and month" "store" "division"}, which exist in a row whose I/O table name is "transaction history" in Table 1400. Table 1403 of FIG. 10 indicates thus generated candidates for a partitioning key of each I/O table, (3) S403

Upon completion of the process S402 for determining a partitioning key for each table, the system definition program 5 further determines a volume of the database, a table space of the volume and a file of the volume. Specifically, the following processes shown in FIG. 11 are executed.

At first, the system definition program 5 groups a plurality of I/O tables, the name of which having been extracted in step S501, so that the tables included in a same SQL statement respectively belong to groups different from each other, and group names thus obtained are respectively allocated with volume names (S601). Accordingly, I/O tables which are simultaneously accessed are made to belong respectively to volumes different from each other.

For example, the volume determination is carried out as the following, when two SQL statements 1201a, 1201b as shown in FIG. 6 are included in the database information. Two I/O table names "store summary" "transaction history" included the SQL statement 1201a are determined as I/O table names to be categorized into groups different from each other, and two I/O table names "division summary", "transaction history" included in the other SQL statement 1201b are determined as I/O table names to be categorized into groups different from each other. Further, in order to minimize the group number, the I/O table names {"division summary", "store summary"}, which are not included in a same SQL statement, are put together in one group. With the categorization as described above, as shown in FIG. 12, two groups {"transaction history"}, {"store summary" "division summary"} are generated, and volume names VOL 1, VOL 2 are assigned to those groups respectively.

Next, the system definition program 29 uses the CPU information and the record number information among the database related information to determine the number of partitions of each table (S602). Specifically, the number of partitions is determined for each table by means of the following formula (1).

$$\text{Number of partitions of a table} = \text{MIN (CPU count, record count}/K) \quad (1)$$

Here, MIN is a function to return a smaller value out of two values given as arguments, and K is a constant number (e.g., 10000) or a value determined according to the CPU specification (e.g., K becomes larger, as the CPU specification is larger).

For example, when each record count included in the record number information as shown in FIG. 5 and the CPU count of the CPU information as shown in FIG. 7 are substituted into the formula above, the number of partitions for each table is determined as shown in Table 1600 of FIG. 13.

After the number of partitions for each table is determined, the system definition program 5 allocates to each volume, files and table spaces, the number of which correspond to the maximum number of the partitions of the table belonging to each volume (S603).

For example, based on the number of partitions as indicated in the table 1600 in FIG. 13, the file and the table space for the two volumes, VOL1, VOL2, shown in Table 1500 in FIG. 12, are determined as the following. Since only the transaction history table with the number of partitions "4" belongs to the volume VOL1, the maximum value of the number of partitions of the table belonging to the volume VOL1 is "4". Therefore, as shown in Table 1700 in FIG. 14, four sets of file and table space 1701a, {file 11, table space 11}, {file 12, table space 12}, {file 13, table space 13}, {file 14, table space 14} are allocated in the volume VOL1. To the other volume VOL2, the store summary table having number of partitions "4", and the division summary table having the number of partitions "4" belong, and thus, the maximum number of the partitions of the table belonging to the volume VOL2 is also "4". Therefore, as shown in Table 1700 in FIG. 14, four sets of file and table space 1701b, {file 21, table space 21}, {file 22, table space 22}, {file 23, table space 23}, {file 24, table space 24} are allocated in the volume VOL2.

Further, the system definition program 5 allocates on each I/O table, a table space of the volume to which it belongs, the number of the table spaces corresponding to the number of partitions, as a table space for storage location of each I/O table.

For example, as shown in FIG. 12, since the I/O table "transaction history" belongs to VOL1, four table spaces (table space 11, table space 12, table space 13, and table space 14) out of the table spaces belonging to the VOL1, are allocated as table spaces for storage location of the I/O table "transaction history". Here, the number of the table spaces corresponds to the number of partitions "4" of the I/O table "transaction history". As for the I/O table "store summary", since it belongs to VOL2, four table spaces (table space 21, table space 22, table space 23, table space 24) out of the table spaces belonging to the VOL2, are allocated as table spaces for storage location of the I/O table "store summary". Here, the number of the table spaces corresponds to the number of partitions "4" of the I/O table "store summary". Similarly, to the I/O table "division summary", four table spaces (table space 21, table space 22, table space 23, and table space 24) belonging to VOL2 are allocated. FIG. 15 shows an allocation result of the table spaces concerning the I/O tables, "transaction history" "store summary" and "division summary".

(4) S404

Figures 16, 17:
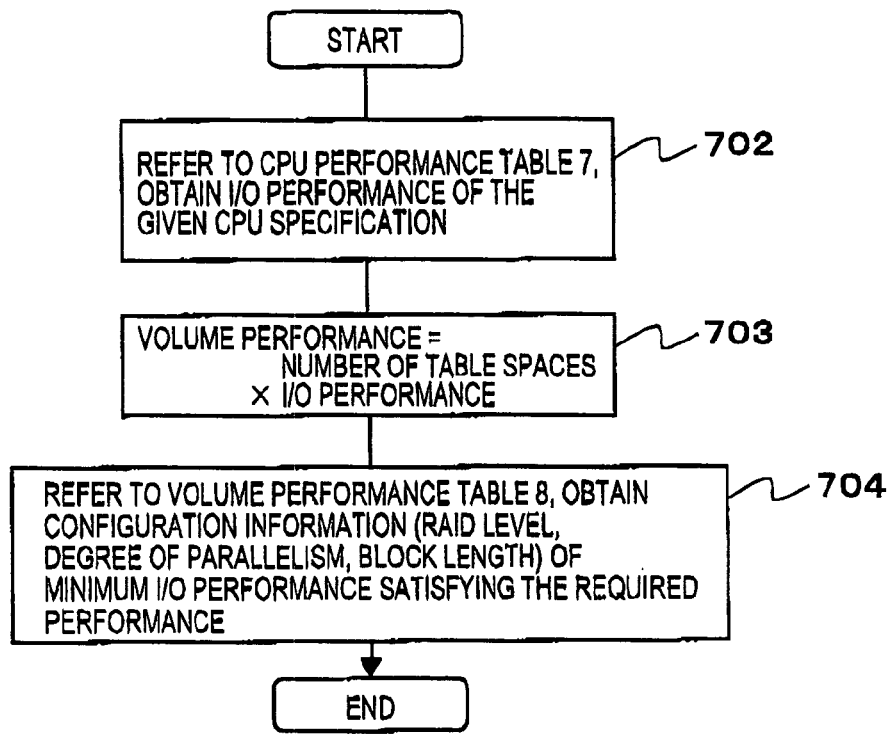
FIG. 16 is a flowchart showing a process executed in step S404 in FIG. 8.
FIG. 17 is an illustration showing an example of volume performance and configuration information, which have been determined by volume.

Upon completion of the processes S402 to S403 for determining a table partitioning key, the number of partitions of a table, table space and a volume, the system definition program 5 determines an I/O performance (volume performance) required for the volume, and configuration information (RAID level, stripe width and block length data) for implementing the above volume performance. Specifically, the following processes as shown in FIG. 16 are executed.

At first, the system definition program 5 retrieves from the CPU performance table 7, data processing performance information 202, which is associated with the CPU specification included in the database related information (S702). For example, if the CPU information as shown in FIG. 7 is included in the database related information, data processing performance information "20 MB/s" being associated with the CPU specifications "41.4 GHz" of the CPU information is retrieved from the CPU performance table 7 of FIG. 2.

Next, the system definition program 5 calculates I/O performance (volume performance) required for each volume, by use of the data processing performance information and the table space number of each volume (S703). More specifically, the following formula (2) is used.

$$\text{Volume performance} = \text{Number of table spaces in volume} \times \text{Data processing performance information} \quad (2)$$

For example, since the table space number of each of the two volumes VOL1, VOL2 as shown in Table 1700 in FIG. 14 is "4", when the data processing performance information "20 MB/s" obtained in step S702 is used, the volume performance for each of the two volumes VOL1 and VOL2 is calculated as 4×20 MB/s=80 MB/s, according to the above formula (2).

Further, the system definition program 5 retrieves from the volume performance table 8, configuration information (RAID level, stripe width, block length data), which is associated with the I/O performance information indicating the I/O performance equal to or higher than the volume performance obtained in step 703, as well as indicating the I/O performance closest to the above volume performance (S704) For example, since the volume performance of the volume VOL1 is "80 MB/s", the configuration information, associated with the I/O performance information indicating I/O performance of at least "80 MB/s" as well as being closest to "80 MB/s", i.e., "RAID level "0+1", stripe width "4" and block length data "64K bites" is retrieved from volume performance table 8 in FIG. 3 as configuration information of the volume VOL1. As thus described, in the present embodiment, following configuration information is retrieved from the volume performance table 8: The configuration information is capable of implementing a volume performance, which is equal to or higher than the I/O performance on the database server, as well as having the least difference from the I/O performance on the database server. Therefore, it is possible to prevent the storage subsystem 3 from becoming a bottleneck in performance, as well as minimizing a resource required for the storage subsystem.

Table 1900 in FIG. 17 shows the volume performance 1901 and the configuration information 1902 for the volumes VOL1 and VOL2, respectively, which have been determined by the above processes.

(5) S405

Figures 18, 19, 20:
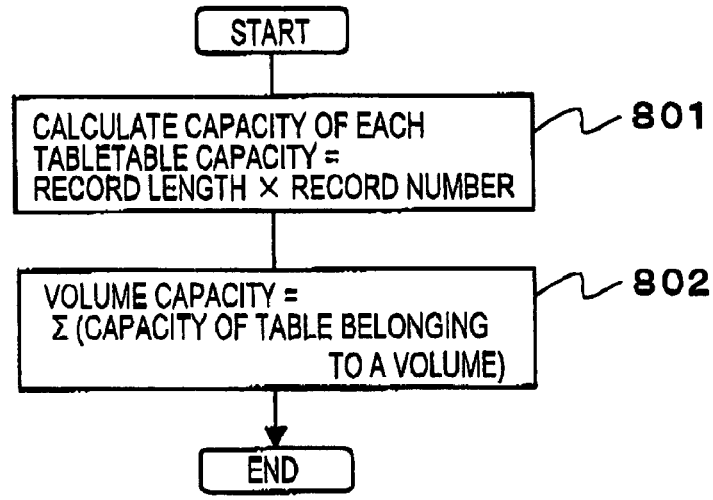
FIG. 18 is a flowchart showing a process executed in step S405 in FIG. 8.
FIG. 19 is an illustration showing an example of a table capacity having been determined by table.
FIG. 20 is an illustration showing an example of a volume capacity having been determined by volume.

Upon completion of the process S404 for determining the volume performance and the configuration information of a volume, the system definition program 5 calculates a capacity required for the volume. More specifically, the following processes as shown in FIG. 18 are executed.

At first, the system definition program 5 uses the record count and table definition statement included in the database related information, so as to calculate the capacity of each table (S801). Specifically, it is calculated by use of the following formula (3).

$$\text{Table capacity} = \text{Record count} \times \text{Record length} \quad (3)$$

Here, the record length corresponds to a sum of data lengths of the data type defined in the table definition statement.

For example, in the table definition statement 1001a as shown in FIG. 4, it is defined that one record in the transaction history table includes, year and month data in DATE type, 8 bytes, customer data in CHAR type, 5 bytes, store data in CHAR type, 5 bytes, division data in CHAR type, 5 bytes, item data in CHAR type, 5 bytes, and amount of money data in DECIMAL type, 15 bytes. Therefore, the record length of the transaction history table is 43 bytes. According to FIG. 5, since the record count of the transaction history table is 10 million, the table capacity of the transaction history table is calculated from the above formula (3) as approximately 410 MB. Table 2000 in FIG. 19 shows the table capacity for each of the transaction history table, the store summary table and the division summary table, having been calculated in according to the above manner.

Next, the system definition program 5 calculates for each volume, a total of the capacity of tables belonging to the volume, as a volume capacity (S802) For example, as shown in FIG. 12, the store summary table and the division summary table belong to the volume VOL2. Therefore, the volume capacity of the VOL2 is calculated as a total of the table capacity of the store summary table and that of the division summary table. The volume capacities of the two volumes VOL1 and VOL2 thus calculated are shown in Table 2100 of FIG. 20.

(6) S406

Figures 21, 22:
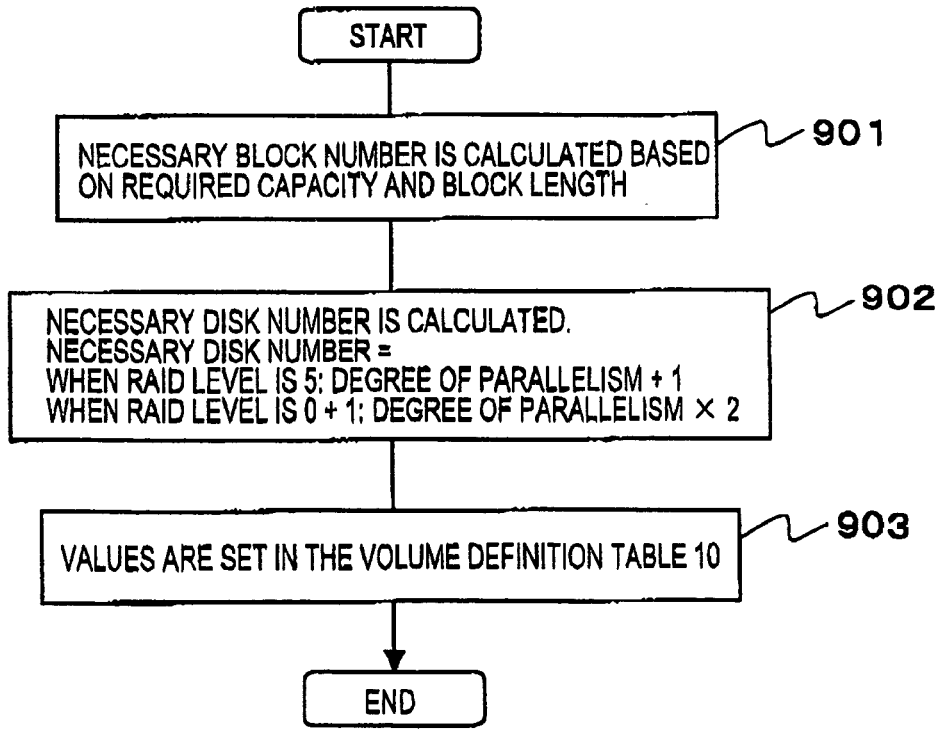
FIG. 21 is an illustration for explaining information included in a volume definition request which a storage subsystem is issued.
FIG. 22 is a flowchart showing a volume definition process which a volume definition program executes, the program being called in step S406 of FIG. 8.

Upon completion of the process S405 for determining the table capacity of the volume, the system definition program 5 issues a volume definition request to the storage subsystem 3, as shown in FIG. 21, and then executes a process of S407. The volume definition request includes corresponding information 2210a, 2210b between the information 2202 (volume capacity, RAID level, stripe width, stripe size) having been obtained by volume with the processes above, and the volume name 2201.

In the meantime, in the storage subsystem 3, a volume definition program 6 is started in response to this volume definition request, and the process as shown in FIG. 22, described below, is executed.

At first, the volume definition program 6 calculates block count of each volume, by use of the volume capacity and the block length of each volume, out of the information included in the volume definition request from the management server 1 (S901) Specifically, the following formula (4) is used.

Block count=Volume capacity/Block length (4)

For example, the block counts of the aforementioned two volumes VOL1, VOL2, are respectively 410 MB/64 KB=6560, and 148 MB/64 KB=2368 according to the above formula (4).

Next, the volume definition program 6 calculates the disk count required for each volume by a mathematical formula established for every RAID level (S902). As an example of such mathematical formula, the followings (5) and (6) are given.

When the RAID level=5:

Disk count=$S$ tripe width (5)

When the RAID level=0+1:

Disk count=$S$ tripe width×2 (6)

For example, since both the two volumes VOL1, VOL2 as described above have RAID level of "0+1", and stripe width of "4", the disk count required for each of the two volumes VOL1 and VOL2 is calculated as 8, according to the above formula (6).

The volume definition program 6 allocates the disks of the count as thus calculated respectively to the volumes, and as shown in FIG. 23, for each of the allocated disks, the volume definition program registers in the volume definition table 10 the volume configuration information 2310 including the volume name 2301, RAID level 2302, disk name 2303, start block 2304 and end block 2305 (S903). In the present embodiment, the start block is set to zero, and a value obtained by dividing the block count by the stripe width is set as the end block.

For example, since 8 (eight) disks are respectively allocated to the aforementioned two volumes, 16 (sixteen) records of volume configuration information are newly registered in the volume definition table 10.

(7) S407

While the volume definition program executes a process of FIG. 22, the system definition program 5 generates a table space definition statement, and issues a database definition request including the table space definitions statement to the database management system 9 of the database server 2. Specifically, the following processes as shown in FIG. 24 are executed.

At first, the system definition program 5 calculates a capacity of each table space for each volume, by use of the following formula (7) (S2401).

Table space capacity=Volume capacity/Number of table spaces in the volume (7)

For example, since the volume capacity and the number of table spaces in the volume VOL1 are respectively "410 MB" and "4", the table space capacity of the volume VOL1 is calculated as 410 MB/4=102.5 MB. Similarly, the table spaces capacity of the volume VOL2 are calculated as 37 MB (S2401).

Next, the system definition program 5 generates a table space definition statement based on a result of the aforementioned processes, and then, issues a table space definition request including the statement to the database management system 9 of the database server 2 (S2402). As shown in FIG. 25, in the table space definition statement 2501 as generated here, there are described for every table space, a table space name, size (table space capacity as calculated in S2401), volume name (volume name determined in S403: see FIG. 14), and/or file name (file name determined in S403: see FIG. 14). As for the grammar of the table space definitions statement, it is different according to the type of the database management system 9. Therefore, the table space definition statement generated by the system definition program 5 at this stage does not necessarily follow the grammar as shown in FIG. 25.

In addition, the system definition program 5 adds a partitioning key (see FIG. 10) and a table space storage location (see FIG. 15) of each table to the table definition statement of the database related information. Description examples of the partitioning key and the table space storage location of each table are shown in FIG. 26. In each of the table definition statements 2601a to 2601c, the description, i.e., "PARTITION BY" phrase followed by a partitioning key and "INTO" phrase followed by a name of table space storage location, is added to the description of the corresponding table definition statement as shown in FIG. 4. For example, the table definition statement 2601a of the I/O table "transaction history" corresponds to the description that the phrase "PARTITION BY year and month, store, division" and the phrase "INTO table space 11, table space 12, table space 13, table space 14" are added to the description of the table definition statement 1001a of FIG. 4. Since the table definitions statement as shown in FIG. 26 may vary according to the type of the database management system 9, the table definition statement as generated by the system definition program 5 at this stage does not necessarily follow the format as shown in FIG. 26.

Then, the system definition program 5 issues a table definition request including these table definition statements to the database management system 9 of the database server 2 (S2403).

When the database management system 9 receives the table space definition request and the table definition request from the management server 1, it creates a database on the storage subsystem 3, based on the database definition information included in those requests (table space definition statement, table definition statement). In other words, the database management system 9 allocates on the storage subsystem 3 a table space to store the files according to the definition of the table space definition statement, and stores the tables created by the definition of the table definition statement in those files.

As thus described, with the system definition process according to the present embodiment, it is possible to automatically determine based on the database design information, both the volume definition information (the volume capacity, RAID level, stripe width and block length data) required for volume definition of the storage subsystem, and information (the table space definition statement, table definition statement including partitioning key and the definition as to the table space) required for creating a database on the storage subsystem, Therefore, even if the above information items are not defined in advance, the user can carry out both the volume definition in the storage subsystem and the database definition in the database server, with only one-time input of the database design information. In other words, it is possible to carry out setting of both the database management system and the storage subsystem more efficiently.

Since the volume setting of the storage subsystem is carried out based on the configuration information that can implement a volume performance having at least I/O performance of the database server side, with a minimum difference from the I/O performance level of the database server side, it is possible to prevent the storage subsystem from becoming a bottleneck in performance, and it is also possible to minimize the required resource for the storage subsystem. Since a plurality of tables set as I/O tables in a same SQL statement are categorized into volumes different form each other, so that a plurality of tables which are accessed simultaneously are to be stored in physically separate disks, it is possible to prevent a bottleneck on input-output. Therefore, with the system definition process according to the present embodiment, a database system having highly enhanced performance can be easily implemented.

Figure 27:
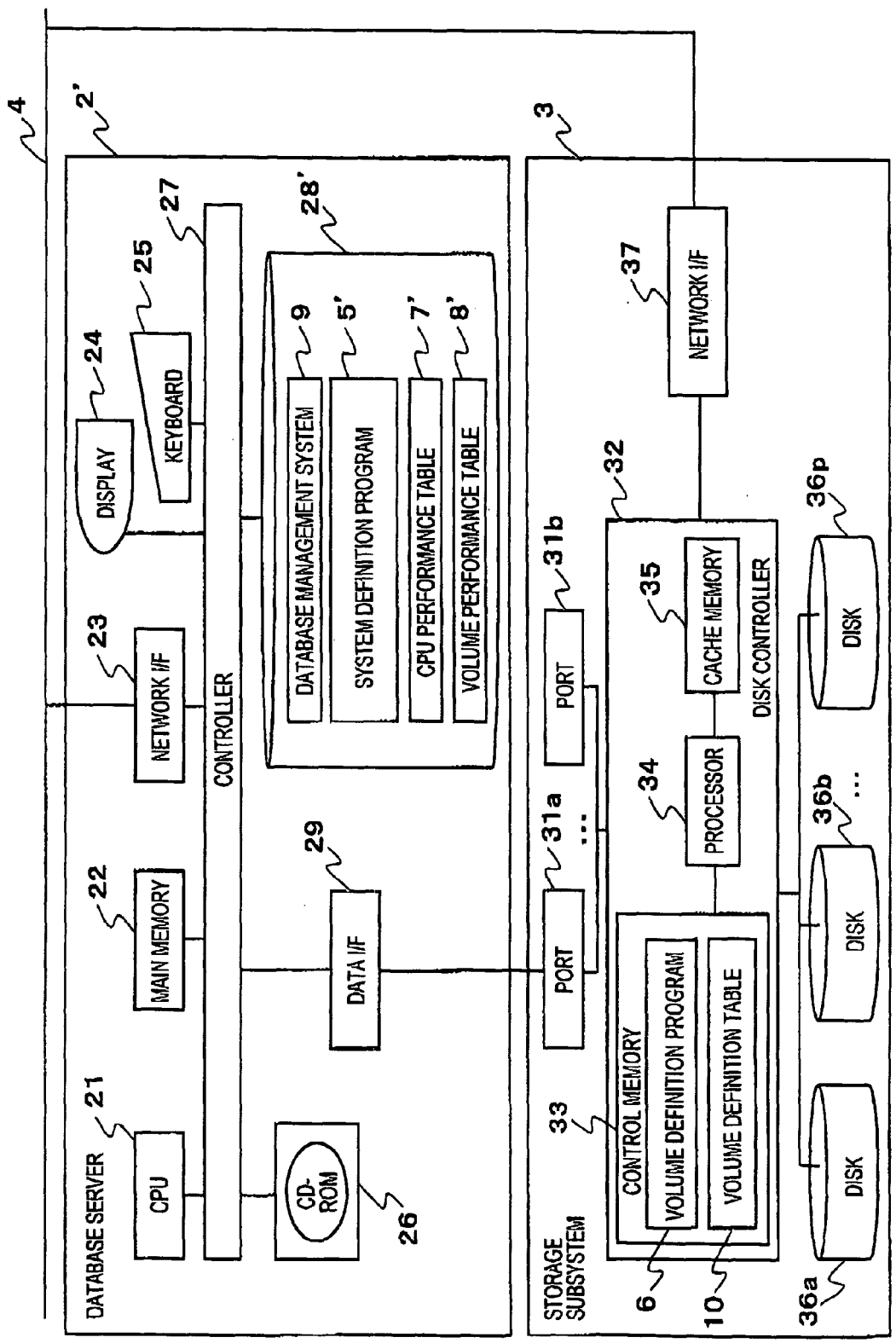
FIG. 27 is schematic diagram of the information processing system relating to another embodiment of the present invention.

Here, in the above embodiment, the management server and the database server are implemented by separate computers, but the management server and the database server can be also implemented by one computer. An example having such system configuration is shown in FIG. 27. Hereinafter, a configuration different from the information processing system of FIG. 1 will be explained, with reference to the information processing system as shown in FIG. 27.

In the information processing system as shown in FIG. 27, which is different from that of FIG. 1, a storage device 28' in the computer 2', which is connected to the storage subsystem 3 via a channel, stores, in addition to the database management system program 9, a system definition program 5', a CPU performance table 7' having a same data structure as that of the aforementioned CPU performance table 7, and a volume performance table 8' having a same data structure as that of the aforementioned volume performance table 8. In other words, in the information processing system of FIG. 27, the database server also serves as a management server. With this information processing system, processes similar to those executed in the information processing system of FIG. 1 are executed, except that the system definition program 5' gives a table space definition request and a table definition request to the database management system program 9 via the main memory. Even in this information processing system, it may be possible for the system definition program 5' to go once through the network 4, so as to give the table space definition request and the table definition request to the database management system program 9.

As described above, according to the present invention, it is possible to carry out an efficient setting of both the database management system and the storage subsystem.

What is claimed is:

1. A computer comprising,
   an input means arranged to receive an input of database design information, and
   a system definition means which generates, from said database design information, database definition information determining a volume to be used as a storage location for data of a plurality of tables constituting said database, and volume definition information determining a configuration required for said volume, and outputs said volume definition information as information to be given to a storage subsystem having a plurality of memory devices to be allocated to said volume based on said volume definition information, and said database definition information as information to be given to a database server which is a server to store, based on said database definition information, data of each of said plurality of tables in said volume of said storage subsystem, and to access said volume of said storage subsystem in response to a request from outside;
   wherein said system definition means generates said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

2. A computer according to claim 1, comprising a storage means which stores a volume performance table, in which said volume definition information and I/O performance information indicating an I/O performance of said volumes are associated with each other, said volume definition information including said configuration information and said volume performance being calculated from said I/O performance information.

3. A computer according to claim 2, wherein,
said I/O performance information includes CPU specification information and a CPU count of said database server,
said storage means stores a CPU performance table where the CPU specification information and data throughput of a plurality of types of CPU are associated with each other, and
said system definition means retrieves data throughput associated with the CPU specification information included in said I/O performance information, and also retrieves the volume definition information associated with the volume performance information indicating the I/O performance, which is determined based on said data throughput and the CPU count included in said performance related information.

4. A computer according to claim 3, wherein,
said performance related information includes a plurality of data manipulation information items where a data manipulation as to said plurality of tables is described in data manipulation language, and
said system definition means generates said database definition information where storage locations for at least two tables described in a same data manipulation information item out of said plurality of data manipulation information items are determined to be respectively in volumes different from each other.

5. A computer according to claim 2, wherein,
said I/O performance information includes a plurality of data manipulation information items where a data manipulation as to said plurality of tables is described in data manipulation language, and
said system definition means generates said database definition information where storage locations for two tables described in a same data manipulation information item out of said plurality of data manipulation information items are determined to be respectively in volumes different from each other.

6. An information processing system comprising,
a computer which includes an input means arranged to receive an input of database design information, and a system definition means which generates, from said database design information, database definition information determining a volume to be a storage location of data of a plurality of tables constituting said database, and volume definition information determining a configuration required for said volume; and
a storage subsystem which includes a plurality of storage devices, receives said volume definition information from said computer, and determines from said volume definition information a storage device on which said volume is to be configured out of said plurality of storage devices,
wherein said computer comprises a database management means which receives said database definition information from said system definition means, stores the data of each of said tables in the volume of said storage subsystem in accordance with said received database definition information, and accesses the volume of said storage subsystem in response to a request from outside; and
wherein said system definition means generates said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

7. An information processing system comprising:
a first computer which includes an input means arranged to receive an input of database design information, and a system definition means which generates, from said database design information, (1) database definition information defining (a) a structure of a plurality of tables constituting the database and (b) a volume to be a storage location for data of said plurality of tables, and (2) volume definition information defining a condition for determining a configuration of said volume;
a storage subsystem which includes a plurality of storage devices, receives said volume definition information from said first computer, and determines from said volume definition information a storage device on which said volume is to be configured out of said plurality of storage devices; and
a second computer which receives said database definition information from said first computer, stores said data of each of the tables in the volume of said storage subsystem in accordance with said received database definition information, and accesses said volume of said storage subsystem in response to a request from outside;
wherein said first computer generates said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

8. A computer comprising,
an input device arranged to receive an input of database design information,
a processor, and
a computer storage medium which stores a system definition program,
said system definition program when executed by said processor being operable to configure the processor to:

generate, from said database design information, database definition information determining a volume to be used as a storage location for data of a plurality of tables constituting said database, and volume definition information determining a configuration required for said volume, and output said volume definition information as information to be given to a storage subsystem having a plurality of memory devices to be allocated to said volume based on said volume definition information, and said database definition information as information to be given to a database server which is a server to store, based on said database definition information, data of each of said plurality of tables in said volume of said storage subsystem, and to access said volume of said storage subsystem in response to a request from outside;

wherein said system definition program further causes said processor to generate said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

9. A computer comprising, an input device arranged to receive an input of database design information, a processor, and a computer storage medium which stores a system definition program and database management program, said system definition program, when executed by said processor, being operable to configure said processor to:

generate from said database design information, database definition information determining a volume to be used as a storage location for data of a plurality of tables constituting said database, and volume definition information determining a configuration required for said volume, and connect a storage subsystem comprising a plurality of storage devices allocated to said volume based on said volume definition information, and outputs to said storage subsystem said volume definition information, and said database management program, when executed by said processor, being operable to said processor to;

store the data of each of said tables in the volume of said storage subsystem in response to said database definition information, and access the volume of said storage subsystem in response to a request from outside;

wherein said system definition program further causes said processor to generate said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

10. A computer comprising, an input means arranged to receive an input of database design information, a system definition means which generates, from said database design information, database definition information determining a volume to be used as a storage location for data of a plurality of tables constituting said database, and volume definition information determining a configuration required for said volume, a connecting means which connects a storage subsystem comprising a plurality of storage devices allocated to said volume based on said volume definition information, and outputs to said storage subsystem said volume definition information, and a database management means which stores the data of each of said tables in the volume of said storage subsystem in response to said database definition information, and accesses the volume of said storage subsystem in response to a request from outside;

wherein said system definition means generates said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance reguired for each volume from said database design information, and obtaining configuration information for implementing the volume performance from said database design information.

11. A program which is executed by a computer having an input means and a system definition means, wherein when the program is executed by said computer, the program causes:

said input means to perform an input process which receives an input of database design information, said system definition means to perform a system definition process which generates, from said database design information, database definition information determining a volume to be a storage location of data of plural tables constituting said database, and volume definition information determining a configuration required for said volume, and said system definition means to perform an output process which outputs said volume definition information as information to be given to the storage subsystem having a plurality of storage devices allocated to said volume based on said volume definition information, and said database definition information as information to be given to a database management program which stores, based on said database definition information, data of each of said tables in the volume of said storage subsystem;

wherein said system definition means generates said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

12. A computer readable recording medium in which a program according to claim 11 is recorded.

13. A program according to claim 11, wherein, said database design information includes performance related information concerning an I/O performance with respect to the volumes of said storage subsystem, said system definition means in said system definition process retrieves as information to be given to said storage subsystem, the volume definition information associated with the volume performance information determined based on said performance related information, from the volume performance table where the volume definition information indicating a volume configuration and the volume performance information indicating the I/O performance of the volume.

14. A computer readable recording medium in which a program according to claim 13 is recorded.

15. A program according to claim 13, wherein, said performance related information includes CPU specification information and a CPU count of a CPU which executes said database management program, said system definition means in said system definition process retrieves data throughput associated with the CPU specification information included in said performance related information, from the CPU performance table where the CPU specification information and said data throughput of said CPU are associated with each other.

16. A computer readable recording medium in which a program according to claim 15 is recorded.

17. A program according to claim 15, wherein, said performance related information includes a plurality of data manipulation information items where a data manipulation as to said plural tables is described, and said system definition means in said system definition process, generates said database definition information where storage locations for two tables described in a same data manipulation information item out of said plurality of data manipulation information items are determined to be respectively in volumes different from each other.

18. A computer readable recording medium in which a program according to claim 17 is recorded.

19. A program according to claim 13, wherein, said performance related information includes a plurality of data manipulation information items where a data manipulation as to said plural tables is described, and said system definition means in said system definition process, generates said database definition information where storage locations for two tables described in a same data manipulation information item out of said plurality of data manipulation information items are determined to be respectively in volumes different from each other.

20. A computer readable recording medium in which a program according to claim 19 is recorded.

21. A program according to claim 11, wherein, said performance related information includes a plurality of data manipulation information items where a data manipulation as to said plural tables is described, and said system definition means in said system definition process, generates said database definition information where storage locations for two tables described in a same data manipulation information item out of said plurality of data manipulation information items are determined to be respectively in volumes different from each other.

22. A computer readable recording medium in which a program according to claim 21 is recorded.

23. A system setting method, wherein, a computer having an input device and a system definition means carries out setting of a storage subsystem including a plurality of storage devices constituting a volume, and a database management program accesses the volume of said storage subsystem, the method comprising, an input process in which said input device receives an input of database design information, a system definition process in which said system definition means generates, from said database design information, database definition information determining a volume as a storage location for data of a plurality of tables constituting said database and volume definition information determining a configuration required for said volume, and outputs said volume definition information as information to be given to said storage subsystem and said database definition information as information to be given to said database management program, a volume definition process in which said storage subsystem determines, in response to said volume definition information, a storage device configuring said volume, out of said plurality of storage devices, and a database definition process in which said database management program stores, in response to said database definition information, data of each of said tables in the volume of said storage subsystem;

wherein said computer generates said database definition information by obtaining grouping columns for each table defined in said database design information, generating a partitioning key of a logical OR of the grouping columns for each of said tables, grouping said tables into volumes so that all of said tables that are accessed simultaneously according to said database design information belong to different respective volumes, calculating the number of partitions for each of said tables from said database design information, dividing each of said volumes according to the calculated number of partitions to obtain a number of table spaces to be allocated to each of said tables, allocating table spaces equivalent to the number of table spaces thus obtained to each of said tables, calculating a volume performance required for each volume from said database design information, and obtaining configuration information for implementing the volume performance from said database design information.

24. A system setting method according to claim 23, wherein, said computer includes, a storage means which stores a volume performance table, in which volume definition information indicating said volume configuration and I/O performance information indicating an I/O performance of said volumes are associated with each other, said volume definition information including said volume configuration information and said volume performance being calculated from said I/O performance information.

25. A system setting method according to claim 24, wherein, said I/O performance related information includes CPU specification information and a CPU count of said database server, said storage means stores a CPU performance table where the CPU specification information and data throughput of plural types of CPU are associated with each other, said system definition means in said system definition process, retrieves from said CPU performance table, a data throughput associated with the CPU specification information, included in said performance related information, and retrieves from said volume performance table the volume definition information associated with the volume performance information indicating the I/O performance which is determined based on the data throughput and the CPU count included in said performance related information.

26. A system setting method according to claim 25, wherein, said performance related information includes a plurality of data manipulation information items where a data manipulation as to said plurality of tables is described, and said system definition means in said system definition process, generates said database definition information where storage locations for at least two tables described in a same data manipulation information item out of said plurality of data manipulation information items are determined to be respectively in volumes different from each other.

27. A system setting method according to claim 24, wherein, said performance related information includes a plurality of data manipulation information items where a data manipulation as to said plurality of tables is described, and said system definition means in said system definition process, generates said database definition information where storage locations for at least two tables described in a same data manipulation information item out of said plurality of data manipulation information items are determined to be respectively in volumes different from each other.

28. A system setting method according to claim 23, wherein, said performance related information includes a plurality of data manipulation information items where a data manipulation as to said plurality of tables is described, and said system definition means in said system definition process, generates said database definition information where storage locations for two tables described in a same data manipulation information item out of said plurality of data manipulation information items are determined to be respectively in volumes different from each other.

* * * * *